(12) United States Patent
Basu

(10) Patent No.: US 11,783,595 B2
(45) Date of Patent: Oct. 10, 2023

(54) AUTONOMOUS VEHICLE OBJECT DETECTION

(71) Applicant: Micron Technology, Inc., Boise, ID (US)

(72) Inventor: Reshmi Basu, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 226 days.

(21) Appl. No.: 17/322,109

(22) Filed: May 17, 2021

(65) Prior Publication Data

US 2022/0366195 A1 Nov. 17, 2022

(51) Int. Cl.
*G06V 20/58* (2022.01)
*G06V 10/75* (2022.01)
*G06F 18/24* (2023.01)
*G06V 20/56* (2022.01)
*G06V 20/60* (2022.01)

(52) U.S. Cl.
CPC .............. *G06V 20/58* (2022.01); *G06F 18/24* (2023.01); *G06V 10/751* (2022.01); *G06V 20/56* (2022.01); *G06V 20/60* (2022.01)

(58) Field of Classification Search
CPC ........ G06V 20/58; G06V 20/56; G06V 20/60; G06V 10/751; G06F 18/214
See application file for complete search history.

(56) References Cited

U.S. PATENT DOCUMENTS

| | | | | |
|---|---|---|---|---|
| 8,126,642 | B2* | 2/2012 | Trepagnier | G05D 1/0214 |
| | | | | 701/28 |
| 8,948,955 | B2* | 2/2015 | Zhu | B60R 1/00 |
| | | | | 701/23 |
| 11,568,933 | B1* | 1/2023 | Lee | G11C 16/3404 |
| 2008/0161986 | A1* | 7/2008 | Breed | G01S 19/51 |
| | | | | 701/23 |
| 2010/0168949 | A1* | 7/2010 | Malecki | G05D 1/021 |
| | | | | 701/24 |
| 2018/0067194 | A1* | 3/2018 | Wodrich | G01S 13/931 |
| 2021/0133128 | A1* | 5/2021 | Jo | G06F 3/0656 |
| 2022/0027645 | A1* | 1/2022 | Hsiao | G06N 3/045 |
| 2022/0366171 | A1* | 11/2022 | Basu | G06F 9/5016 |

FOREIGN PATENT DOCUMENTS

| | | | |
|---|---|---|---|
| CA | 2811630 A1 * | 3/2012 | |
| EP | 3671687 | 6/2020 | |
| KR | 20120092826 | 8/2012 | |
| WO | 2019175532 | 9/2019 | |
| WO | WO-2021226027 A1 * | 11/2021 | G01S 17/931 |

* cited by examiner

*Primary Examiner* — Shaghayegh Azima
(74) *Attorney, Agent, or Firm* — Brooks, Cameron & Huebsch, PLLC

(57) ABSTRACT

Methods, systems, and apparatuses related to autonomous vehicle object detection are described. An autonomous vehicle can capture an image corresponding to an unknown object disposed within a sight line of the autonomous vehicle. Processing resources available to a plurality of memory devices associated with the autonomous vehicle can be reallocated in response to capturing the image and an operation involving the image corresponding to the unknown object to classify the unknown object can be performed using the reallocated processing resources.

18 Claims, 5 Drawing Sheets

AUTONOMOUS VEHICLE OBJECT DETECTION

TECHNICAL FIELD

The present disclosure relates generally to semiconductor memory and methods, and more particularly, to apparatuses, systems, and methods for autonomous vehicle object detection.

BACKGROUND

Memory devices are typically provided as internal, semiconductor, integrated circuits in computers or other electronic systems. There are many different types of memory including volatile and non-volatile memory. Volatile memory can require power to maintain its data (e.g., host data, error data, etc.) and includes random access memory (RAM), dynamic random access memory (DRAM), static random access memory (SRAM), synchronous dynamic random access memory (SDRAM), and thyristor random access memory (TRAM), among others. Non-volatile memory can provide persistent data by retaining stored data when not powered and can include NAND flash memory, NOR flash memory, and resistance variable memory such as phase change random access memory (PCRAM), resistive random access memory (RRAM), and magnetoresistive random access memory (MRAM), such as spin torque transfer random access memory (STT RAM), among others.

Memory devices may be coupled to a host (e.g., a host computing device) to store data, commands, and/or instructions for use by the host while the computer or electronic system is operating. For example, data, commands, and/or instructions can be transferred between the host and the memory device(s) during operation of a computing or other electronic system.

DETAILED DESCRIPTION

Figure 1:
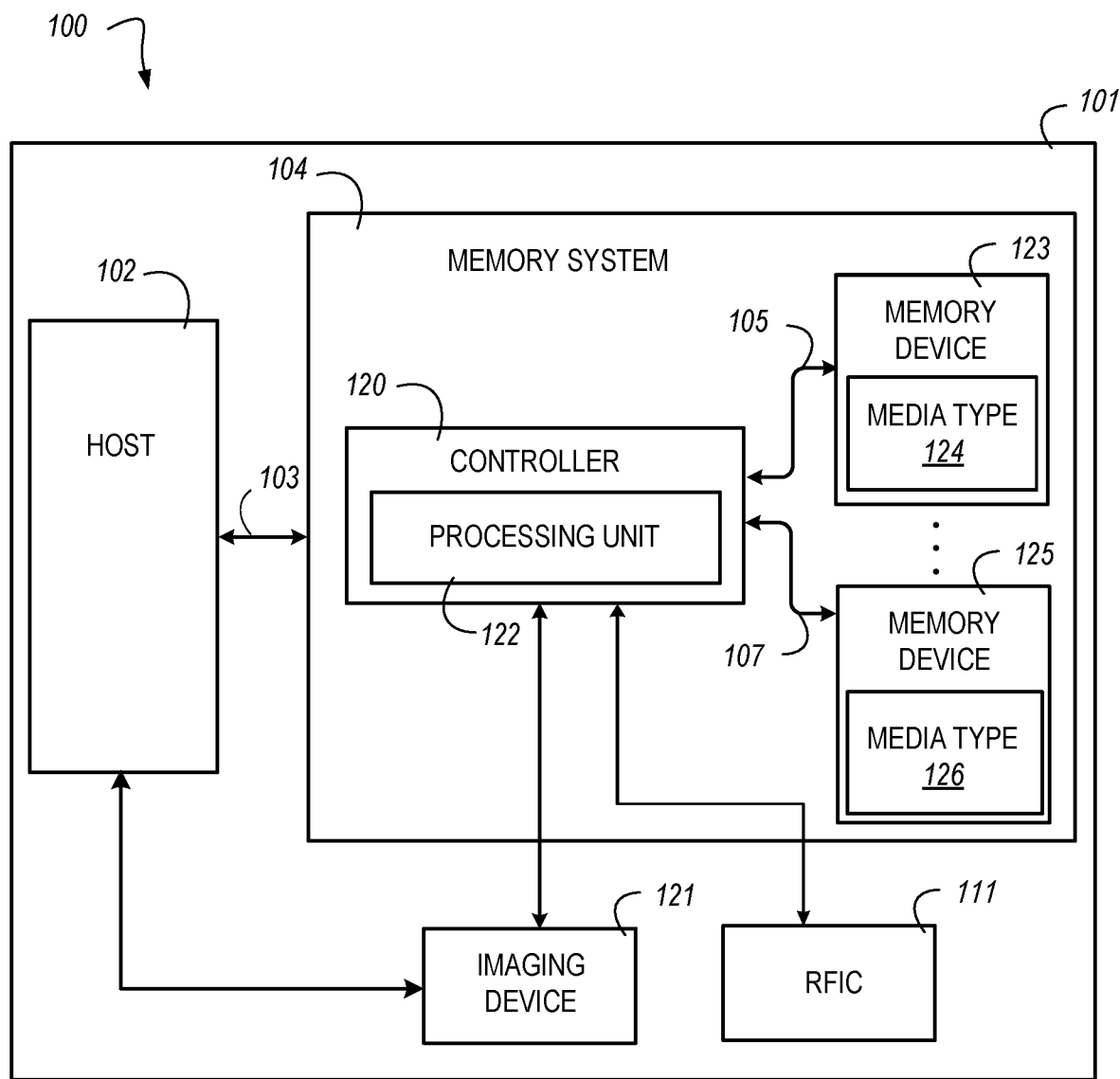
FIG. 1 is a functional block diagram in the form of an apparatus including a host and a memory device in accordance with a number of embodiments of the present disclosure.

Methods, systems, and apparatuses related to autonomous vehicle object detection are described. An autonomous vehicle can capture an image corresponding to an unknown object disposed within a sight line of the autonomous vehicle. Processing resources available to a plurality of memory devices associated with the autonomous vehicle can be reallocated in response to capturing the image and an operation involving the image corresponding to the unknown object to classify the unknown object can be performed using the reallocated processing resources.

As autonomous vehicles (e.g., a vehicle such as a car, truck, bus, motorcycle, moped, all-terrain vehicle, military vehicle, tank, etc. in which at least a portion of the decision-making and/or control over vehicle operations is controlled by computer hardware and/or software, as opposed to a human operator) become increasingly prevalent, concerns regarding the safety of such vehicles must be addressed. Although there exist various approaches to mitigate dangers associated with, and hence improve the safety of, autonomous vehicles, limitations in the computing resources (e.g., computer hardware and software) that controls autonomous vehicles coupled with the ever-changing environments in which autonomous vehicles operate have made such improvements difficult.

For example, the quickness with which an autonomous vehicle must be able to make an accurate determination with respect to objects either in the path of the autonomous vehicle (e.g., in a road on which the autonomous vehicle is operating, etc.) or peripheral to the path of the autonomous vehicle (e.g., traffic signs, other vehicles on the road, etc.) can be limited in some approaches to the speed and/or accuracy at which the computing resources can intake and process received data during operation of the autonomous vehicle. These limitations can be further exacerbated in scenarios in which an unknown object (e.g., an object that has not been previously detected, analyzed, or is not otherwise recognized by the autonomous vehicle for various reasons such as the object being a known object that has been defaced in some manner) is detected by the autonomous vehicle. The terms "objects" or "unknown objects" can be used interchangeably herein with the terms "obstacles" or "unknown obstacles," respectively, herein.

For example, an autonomous vehicle may be readily able to recognize a stop sign on the side of a road and control operations of the autonomous vehicle accordingly. However, if the stop sign is partially covered in snow, dirt, sticker(s), graffiti, or is otherwise defaced, the autonomous vehicle may not be able to recognize the stop sign and control operations of the autonomous vehicle accordingly. In this non-limiting example, failure of the autonomous vehicle to detect and recognize the stop sign due to the stop sign being defaced may lead to a dangerous and unsafe scenario that could, at worst, result in an accident in which human lives are in danger and potentially lost.

Examples of unknown objects that an autonomous vehicle may encounter during operation that are contemplated by the disclosure are, however, not limited to the above example. Accordingly, embodiments described herein can be applied to a wide range of objects that may be classified as unknown objects or objects that have been defaced to the point becoming unknown objects, such as street lights, street signs, construction detritus, debris resulting from weather events, and/or debris resulting from human created events (e.g., debris from automobile accidents that may be have recently been deposited on the road, debris that has fallen from an airplane and has therefore been recently deposited on the road, etc.) among others.

As described in more detail, herein, aspects of the present disclosure can allow for timely and accurate resolution of such unknown objects by purposeful reallocation of computing resources available to the autonomous vehicle such that the most efficient (e.g., the fastest, most accurate, etc.) computing resources are available as needed to process information regarding the unknown object to resolve the unknown object and allow the autonomous vehicle to safely navigate in the presence of the unknown object. As used herein, the terms "resolve" and "resolution," as appropriate given the context, generally refer to identify and/or determine what the unknown object is. For example, if the unknown object is a stop sign that has been defaced, resolving the unknown object generally refers to determining that the unknown object is actually a stop sign.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and structural changes may be made without departing from the scope of the present disclosure.

As used herein, designators such as "N," "M," etc., particularly with respect to reference numerals in the drawings, indicate that a number of the particular feature so designated can be included. It is also to be understood that the terminology used herein is for the purpose of describing particular embodiments only, and is not intended to be limiting. As used herein, the singular forms "a," "an," and "the" can include both singular and plural referents, unless the context clearly dictates otherwise. In addition, "a number of," "at least one," and "one or more" (e.g., a number of memory banks) can refer to one or more memory banks, whereas a "plurality of" is intended to refer to more than one of such things.

Furthermore, the words "can" and "may" are used throughout this application in a permissive sense (i.e., having the potential to, being able to), not in a mandatory sense (i.e., must). The term "include," and derivations thereof, means "including, but not limited to." The terms "coupled" and "coupling" mean to be directly or indirectly connected physically or for access to and movement (transmission) of commands and/or data, as appropriate to the context. The terms "data" and "data values" are used interchangeably herein and can have the same meaning, as appropriate to the context.

The figures herein follow a numbering convention in which the first digit or digits correspond to the figure number and the remaining digits identify an element or component in the figure. Similar elements or components between different figures may be identified by the use of similar digits. For example, 104 may reference element "04" in FIG. 1, and a similar element may be referenced as 204 in FIG. 2. A group or plurality of similar elements or components may generally be referred to herein with a single element number. For example, a plurality of reference elements, e.g., elements 126-1 to 126-N (or, in the alternative, 126-1, . . . , 126-N) may be referred to generally as 126. As will be appreciated, elements shown in the various embodiments herein can be added, exchanged, and/or eliminated so as to provide a number of additional embodiments of the present disclosure. In addition, the proportion and/or the relative scale of the elements provided in the figures are intended to illustrate certain embodiments of the present disclosure and should not be taken in a limiting sense.

FIG. 1 is a functional block diagram in the form of a computing system 100 including an apparatus including a host 102 and a memory system 104 in accordance with a number of embodiments of the present disclosure. In some embodiments, the host 102 and/or the memory system 104 can be part of an electronic control unit (ECU) 101 (e.g., an electronic control unit of an autonomous vehicle). As used herein, an "apparatus" can refer to, but is not limited to, any of a variety of structures or combinations of structures, such as a circuit or circuitry, a die or dice, a module or modules, a device or devices, or a system or systems, for example. In some embodiments, the computing system 100 can be part of an autonomous vehicle (e.g., the autonomous vehicle 541 illustrated in FIG. 5, herein). For example, the computing system 100 can be resident on an autonomous vehicle. In such embodiments, the computing system 100 can control operation of the autonomous vehicle by controlling, for example, acceleration, braking, steering, parking, etc. of the autonomous vehicle.

As used herein, the term "resident on" refers to something that is physically located on a particular component. For example, the computing device 100 being resident on an autonomous vehicle refers to a condition in which the computing system 100 is physically coupled to, or physically within, the autonomous vehicle. The term "resident on" may be used interchangeably with other terms such as "deployed on" or "located on," herein.

Figure 2:
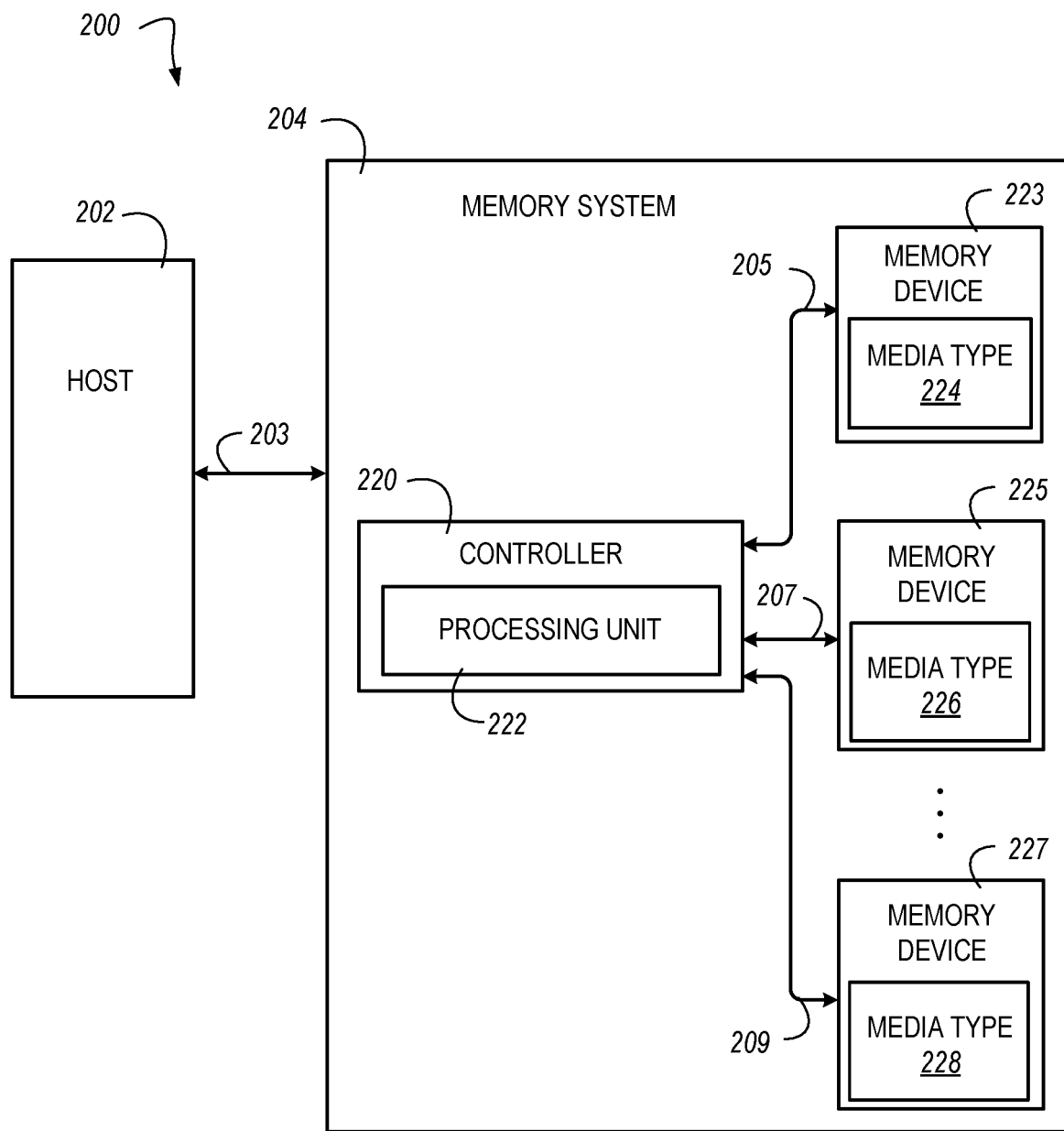
FIG. 2 is another functional block diagram in the form of a computing system including an apparatus including a host and a memory system in accordance with a number of embodiments of the present disclosure.

The memory system 104 can include a number of different memory devices 123, 125 (and/or 227 illustrated in FIG. 2, herein), which can include one or more different media types 124, 126 (and/or 228 illustrated in FIG. 2, herein). The different memory devices 123, 125, and/or 227 can include one or more memory modules (e.g., single in-line memory modules, dual in-line memory modules, etc.).

The memory system 104 can include volatile memory and/or non-volatile memory. In a number of embodiments, memory system 104 can include a multi-chip device. A multi-chip device can include a number of different memory devices 123, 125, and/or 227, which can include a number of different memory types and/or memory modules. For example, a memory system can include non-volatile or volatile memory on any type of a module. As shown in FIG. 1, the memory system 104 can include a controller 120, which can include a processing unit 122. Each of the components (e.g., the ECU 101, the host 102, the controller 120, the processing unit 122, and/or the memory devices 123, 125 can be separately referred to herein as an "apparatus."

The memory system 104 can provide main memory for the computing system 100 or could be used as additional memory and/or storage throughout the computing system 100. The memory system 104 can include one or more memory devices 123, 125, which can include volatile and/or non-volatile memory cells. At least one of the memory devices 123, 125 can be a flash array with a NAND architecture, for example. Further, at least one of the memory devices 123, 125 can be a dynamic random-access array of memory cells. Embodiments are not limited to a particular type of memory device. For instance, the memory system 104 can include RAM, ROM, DRAM, SDRAM, PCRAM, RRAM, and/or flash memory (e.g., NAND and/or NOR flash memory devices), among others.

Embodiments are not so limited, however, and the memory system 104 can include other non-volatile memory devices 123, 125 such as non-volatile random-access memory devices (e.g., NVRAM, ReRAM, FeRAM, MRAM, PCM), "emerging" memory devices such as resistance variable (e.g., 3-D Crosspoint (3D XP)) memory devices, memory devices that include an array of self-selecting memory (SSM) cells, etc., or any combination thereof.

Resistance variable memory devices can perform bit storage based on a change of bulk resistance, in conjunction with a stackable cross-gridded data access array. Additionally, in contrast to many flash-based memories, resistance variable non-volatile memory can perform a write in-place operation, where a non-volatile memory cell can be programmed without the non-volatile memory cell being previously erased. In contrast to flash-based memories and resistance variable memories, self-selecting memory cells can include memory cells that have a single chalcogenide material that serves as both the switch and storage element for the memory cell.

As shown in FIG. 1, the memory devices 123, 125 include different types of memory devices. For example, the memory device 125 can be a 3D XP memory device or a NAND memory device, among others, and the memory device 123 can be a volatile memory device, such as a DRAM device, or vice versa. That is, the memory devices 123, 125 can include different media types 124, 126. Embodiments are not so limited, however, and the memory devices 123, 125 can include any type of memory devices provided that at least two of the memory devices 123, 125 include different media types 124, 126. As used herein, a "media type" generally refers to a type of memory cell architecture that corresponds to the memory devices 123, 125. For example, one of the media types 124, 126 can correspond to an array of memory cells that include at least one capacitor and at least one transistor, while another of the media types 124, 126 can include an array of floating-gate metal-oxide-semiconductor field-effect transistors. In some embodiments, at least one of the media types 124, 126 can include an array of resistance variable memory cells that are configured to perform bit storage based on a change in a bulk resistance associated with the resistance variable memory cells.

As illustrated in FIG. 1, a host 102 can be coupled to the memory system 104. In a number of embodiments, the memory system 104 can be coupled to the host 102 via one or more channels (e.g., channel 103). In FIG. 1, the memory system 104 is coupled to the host 102 via channel 103, which can, in addition, be coupled to the controller 120 and/or the processing unit 122 of the memory system 104. The controller 120 and/or the processing unit 122 are coupled to the memory devices 123, 125 via channel(s) 105, 107. In some embodiments, each of the memory devices 123, 125 are coupled to the controller 120 and/or the processing unit 122 by one or more respective channels 105, 107 such that each of the memory devices 123, 125 can receive messages, commands, requests, protocols, or other signaling that is compliant with the type of memory device 123, 125 (e.g., messages, commands, requests, protocols, or other signaling that is compliant with the media type 124, 126 of the memory devices 123, 125) coupled to the controller 120.

The ECU 101 can further include an imaging device 121. The imaging device 121 can be communicatively coupled to the host 102 and/or to the memory device 104 (e.g., to the controller 120 and/or the processing unit 122). The imaging device 121 can be a camera, sonography device, ultrasound device, stereoscopic imaging device, infrared imaging device, or other imaging device that can capture data that includes images or streams of images (e.g., streaming video and/or "live-streaming video") in real-time and transmit information corresponding to the images and/or streams of images to the computing system 100. In general, the imagining device can be any mechanical, digital, or electronic viewing device; still camera; camcorder; motion picture camera; or any other instrument, equipment, or format capable of recording, storing, or transmitting images, video, and/or information.

As used herein, the term "live-streaming video," and variants thereof, generally refers to sequences of images that are concurrently (or nearly concurrently) captured and processed, reproduced, and/or broadcasted. In some embodiments, "live-streaming" video can be referred to in the alternative herein as "data captured by an imagining device" or "data captured from an imagining device." Further, as used herein, the term "streaming video," and variants thereof generally refers to sequences of images that are captured by an imaging device and subsequently processed, reproduced, and/or broadcasted. In some embodiments, "streaming" video can be referred to in the alternative herein as "data captured by an imagining device" or "data captured from an imagining device."

Generally, such data (e.g., images, streams of images and/or or "live-streaming" video) captured by the imaging device can be processed and/or analyzed by the components of the ECU 101 as part of object detection and/or object recognition for the purpose of safely operating an autonomous vehicle. Object detection and/or object recognition refer to a process performed by the autonomous vehicle (or by circuitry of the autonomous vehicle, such as the ECU 101) to resolve various objects that can be in the path of, or near the path of, the autonomous vehicle. Under ideal operating conditions, such data can be compared against a database of known objects and information resulting from the comparison can be used to instruct the autonomous vehicle on how to behave (e.g., whether to slow down, speed up, stop, etc.).

However, as mentioned above, for various reasons objects that cannot be identified by such comparisons can be present either in the path of the autonomous vehicle or adjacent to the path of the autonomous vehicle (e.g., within a line of sight of the imagining device 121). In many current approaches, these unknown objects can be difficult to resolve or identify, especially in a timely and accurate manner. In contrast, by utilizing aspects of the present disclosure, resolution of unknown objects can be achieved quickly and accurately, thereby improving operation and safety of the autonomous vehicle. For example, embodiments herein can allow for selective processing of workloads involving images and/or video corresponding to the images and/or video captured by the imaging device 121 such that the workloads corresponding to execution of applications involving the same are allocated to the memory devices 123, 125, 227 to optimize the performance of the memory system 104 such that unknown object detection and resolution can be realized using an autonomous vehicle.

In some embodiments, the imaging device 121 can capture data, such as images and/or streaming video (e.g., live-streaming video) that includes images of objects (either known or unknown) and/or obstacles (either known or unknown) used by the autonomous vehicle. For example, in some embodiments, the images and/or steaming video captured by the imaging device 121 can include images of traffic signs that have been defaced, detritus that has accumulated in the path or the periphery of the path of the autonomous vehicle, etc. Such images and/or streaming video can be captured by the imaging device 121 and processed locally within the ECU 101 and/or the memory system 104 as part of an operation to resolve an unknown object that has been captured by the imaging device 121.

The ECU 101 can further include a radio-frequency integrated circuit (RFIC) 111. As used herein, the term "RFIC" generally refers to an electrical integrated circuit that operates in a frequency range suitable for wireless transmission. In some embodiments, the RFIC 111 can facilitate communications between an autonomous vehicle (e.g., the autonomous vehicle 541 illustrated in FIG. 5, herein), a base station (e.g., the base station 543 illustrated in FIG. 5, herein) and/or other autonomous vehicles operating on a road or street on which the autonomous vehicle that includes the RFIC 111 is operating.

In addition, the ECU 101 can further various sensors that are not shown so as to not obfuscate the drawings. For example, the ECU 101 can include inertial sensors, radar sensors, LIDAR sensors, etc. that can be used to assist in navigation and operation of the autonomous vehicle.

The host 102 can be a host system such as a personal laptop computer, a desktop computer, a digital camera, a smart phone, a memory card reader, and/or an internet-of-things (IoT) enabled device, among various other types of hosts. In some embodiments, however, the host 102 includes one or more central processing units that execute instructions to control operation of an autonomous vehicle.

One of ordinary skill in the art will appreciate that "a processor" can intend one or more processors, such as a parallel processing system, a number of coprocessors, etc. The system 100 can include separate integrated circuits or one or more of the host 102, the memory system 104, the control circuitry 120, and/or the memory devices 123, 125, and/or 227 can be on the same integrated circuit. The computing system 100 can be, for instance, a server system and/or a high-performance computing (HPC) system and/or a portion thereof. Although the example shown in FIG. 1 illustrate a system having a Von Neumann architecture, embodiments of the present disclosure can be implemented in non-Von Neumann architectures, which may not include one or more components (e.g., CPU, ALU, etc.) often associated with a Von Neumann architecture.

The memory system 104 can include a controller 120, which can include a processing unit 122. The processing unit 122 can be provided in the form of an integrated circuit, such as an application-specific integrated circuit (ASIC), field programmable gate array (FPGA), reduced instruction set computing device (RISC), advanced RISC machine, system-on-a-chip, or other combination of hardware and/or circuitry that is configured to perform operations described in more detail, herein. In some embodiments, the processing unit 122 can comprise one or more processors (e.g., processing device(s), co-processors, etc.).

The processing unit 122 can perform operations to monitor and/or determine characteristics of workloads (e.g., workloads associated with detection and resolution of unknown objects) running on the memory system 104. The characteristics can include information such as bandwidth consumption, memory resource consumption, access frequency (e.g., whether the data is hot or cold), and/or power consumption in execution of the workloads, among others. The processing unit 122 can control writing of at least a portion of data stored in one memory device 123, 125 to a different memory device 123, 125 in order to optimize execution of the workload, balance the workload between different memory devices 123, 125 to allow for quick and accurate resolution of an unknown object detected by an autonomous vehicle.

In a non-limiting example, an apparatus (e.g., the computing system 100) can include a first memory device 123 comprising a first type of media 124 and a second memory device 125 comprising a second type of media 126. The first memory device 123, the second memory device 125, and the processing unit 122 can, in some embodiments, be resident on an autonomous vehicle (e.g., the autonomous vehicle 542 illustrated in FIG. 5, herein). A processing unit 122 can be coupled to the first memory device 123 and the second memory device 125. The processing unit 122 can cause at least one image corresponding to an unknown object to be captured by, for example, the imaging device 121.

The processing unit 122 can execute instructions to perform a traffic sequence prediction operation. As used herein, the term "traffic sequence prediction operation" generally refers to performance of operations to estimate, determine, or otherwise predict an amount of objects (known or unknown) that the autonomous vehicle will encounter in the future. Traffic sequence prediction operations can include execution of deep-learning algorithms, and/or receipt of information from other autonomous vehicles on the road and/or from base stations in communication with the autonomous vehicle, among others. The traffic sequence prediction operation can be executed to determine a likelihood that the autonomous vehicle will encounter greater than or less than a threshold amount of objects (known or unknown) within a given threshold period of time. For example, the traffic sequence operation can be executed to determine that the road is clear (e.g., minimal traffic and/or objects in the road for miles or kilometers), the road is not clear (e.g., there is heavy traffic ahead and/or a large amount of objects in or near the road for miles and/or kilometers), or somewhere in between.

If the traffic sequence prediction operation determines that the road is not clear, the processing unit 122 can pre-allocate processing resources available to the first memory device 123 and the second memory device 125 in response to a determination that the traffic sequence prediction operation indicates that greater than a threshold amount of objects will be encountered by the autonomous vehicle.

In some embodiments, the processing unit 122 can pre-allocate processing resources available to the first memory device 123 and the second memory device 125 such that a memory device that has higher performance characteristics (e.g., higher bandwidth, higher accuracy, faster performance, etc.) has enough free space to store the image (or videos) corresponding to an unknown object in order to process and/or analyze the unknown object as quickly and as accurately as possible. That is, in some embodiments, the processing unit 122 can allocate the processing and/or memory resources available to the autonomous vehicle in anticipation of encountering an unknown object such that the processing and/or memory resources are available to immediately being resolution of the unknown object.

The processing unit 122 can perform, using the pre-allocated processing resources, an operation involving the captured image(s) (or video) corresponding to the unknown object to classify the unknown object. As described above, classifying the unknown object can include resolving the unknown object to determine what the unknown object is. Resolving the unknown object can include fixing missing or defaced pixels in an image corresponding to the unknown object, execution of machine-learning or deep-learning algorithms, and/or receipt of information corresponding to the unknown object from other autonomous vehicles and/or from a base station in communication with the autonomous vehicle, among other techniques.

In some embodiments, the processing unit 122 can receive information corresponding to the unknown object from a base station (e.g., the base station 543 illustrated in FIG. 5, herein) and cause, using the reallocated processing resources, performance of the operation involving the data corresponding to the unknown object and the received information corresponding to the unknown object to classify the unknown object.

As mentioned above, the first memory device 123 or the second memory device 125 can be a non-persistent (e.g., volatile) memory device, and the other of the first memory device 123 or the second memory device 125 can be a persistent (e.g., non-volatile) memory device. In addition, as mentioned above, in some embodiments, the first type of memory or the second type of memory, or both, comprises sets of memory cells that exhibit different storage characteristics. For example, the first memory device 123 can have a first media type 124 and the second memory device 125 can have a second media type 126 associated therewith.

As mentioned above, in some embodiments, the first memory device or the second memory device has a higher bandwidth than the other of the first memory device or the second memory device and the processing unit 122 can perform the operation to reallocate processing resources available to the first memory device and the second memory device such that a greater amount of processing resources are available to the memory device that has the higher bandwidth for performance of the operation to classify the unknown object. Embodiments are not so limited, however, and in some embodiments, the first memory device or the second memory device has a faster memory access time than the other of the first memory device or the second memory device and the processing unit 122 can perform the operation to reallocate processing resources available the first memory device and the second memory device such that greater amount of processing resources are available to the memory device that has the faster memory access time for performance of the operation to classify the unknown object. Accordingly, in at least one embodiment, the first memory device 123 is a NAND memory device comprising a plurality of single level cells, a high bandwidth memory device, or a DRAM device, and the second memory device 125 is three-dimensional (3D) crosspoint memory device or a NAND memory device comprising a plurality of multi-level cells.

The embodiment of FIG. 1 can include additional circuitry that is not illustrated so as not to obscure embodiments of the present disclosure. For example, the memory system 104 can include address circuitry to latch address signals provided over I/O connections through I/O circuitry. Address signals can be received and decoded by a row decoder and a column decoder to access the memory system 104 and/or the memory devices 123, 125. It will be appreciated by those skilled in the art that the number of address input connections can depend on the density and architecture of the memory system 104 and/or the memory devices 123, 125.

FIG. 2 is another functional block diagram in the form of a computing system 200 including an apparatus including a host 202 and a memory system 204 in accordance with a number of embodiments of the present disclosure. In some embodiments, the computing system 200 can be at least a portion of an electronic control unit (ECU) of an autonomous vehicle, such as the ECU 101 illustrated in FIG. 1, herein. The memory system 204 can include a number of different memory devices 223, 225, 227, which can include one or more different media types 224, 226, 228. The different memory devices 223, 225, and/or 227 can include one or more memory modules (e.g., single in-line memory modules, dual in-line memory modules, etc.). The host 202, memory system 204, controller 220, processing unit 222, memory devices 223, 225, 227 and/or the media types 224, 226, 228 can be analogous to the host 102, memory system 104, controller 120, processing unit 122, memory devices 123, 125 and/or the media types 124, 126 illustrated in FIG. 1, herein.

In some embodiments, each of the memory devices 223, 225, and 227 can be different types of memory devices. Accordingly, in some embodiments, each of the memory devices 223, 225, and 227 can include different media types 224, 226, and 228. In a non-limiting example, the memory device 223 can be a volatile memory device, such as a DRAM device and can include a media type 224 that corresponds to a DRAM memory device (e.g., an array of memory cells that include at least one capacitor and at least one transistor). Continuing with this example, the memory device 225 can be a flash memory device, such as a NAND memory device and can include a media type 226 that corresponds to a NAND memory device (e.g., comprises an array of floating-gate metal-oxide-semiconductor field-effect transistors). In this non-limiting example, the memory device 227 can be an emerging memory device (e.g., the emerging memory device 439 illustrated in FIG. 4, herein), such as the emerging memory devices described above, and can include a media type 228 that corresponds to an emerging memory device (e.g., an array of resistance variable memory cells that are configured to perform bit storage based on a change in a bulk resistance associated with the resistance variable memory cells).

The memory devices 223, 225, and 227 can be configured to read, write, and/or store data corresponding to one or more workloads executed by the computing system 200 to detect and resolve an unknown object detected by an autonomous vehicle. An application corresponding to the workload can be executed by, for example, the processing unit 222 to cause the data written to the memory devices 223, 225, and 227 to be used in execution of the workload to process and analyze unknown objects captured by an imaging device (e.g., the imaging device 121 illustrated in FIG. 1) as part of operating an autonomous vehicle (e.g., the autonomous vehicle 542 illustrated in FIG. 5).

For example, if data corresponding to a particular workload is stored in the memory device 223, the controller 220 and/or the processing unit 222 can, in response to a determination that the workload (e.g., a workload involving resolving an unknown object) may be more efficiently executed (e.g., optimized) using a different memory device, cause at least a portion of the data corresponding to the particular workload to be written to the memory device 225 and/or to the memory device 227.

In such examples, the processing unit 222 can determine the characteristics of the executed workload while the data is written to the memory device 223, the memory device 225, or the memory device 227 by monitoring at least one of an access frequency of data associated with the workload, a latency associated with execution of the workload, and/or an amount of processing resources consumed in execution of the workload and write at least the portion of data associated with the workload to at least one of the other of the memory device 223, the memory device 225, or the memory device 227 based, at least on part, on the determined access frequency of data associated with the workload, the latency associated with execution of the workload, and/or the amount of processing resources consumed in execution of the workload.

Figure 3:
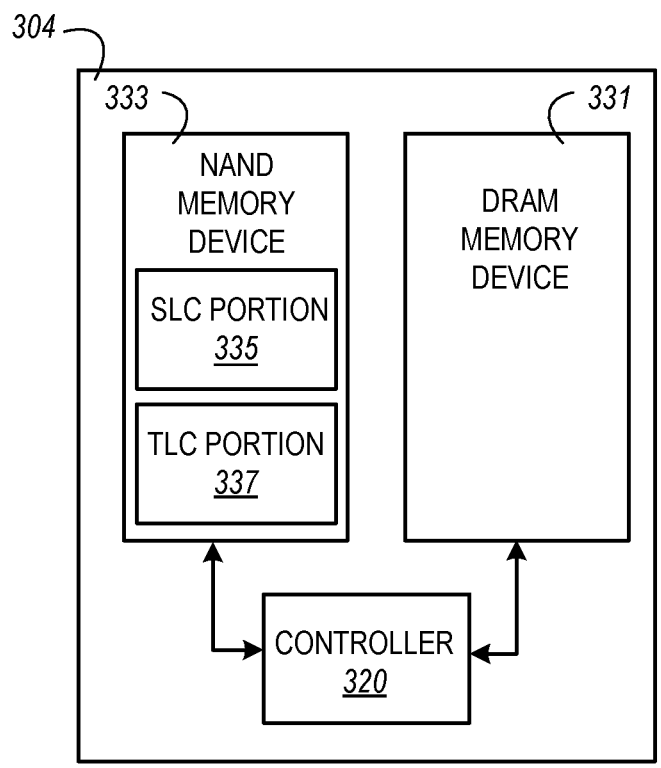
FIG. 3 is a functional block diagram in the form of an apparatus including a memory system in accordance with a number of embodiments of the present disclosure.

FIG. 3 is a functional block diagram in the form of an apparatus including a memory system 304 in accordance with a number of embodiments of the present disclosure. FIG. 3 illustrates a memory system 304, which can be analogous to the memory system 104 illustrated in FIG. 1 and/or the memory system 204 illustrated in FIG. 2, herein. As shown in FIG. 3, the memory system 304 includes a controller 320 (which can be analogous to the controller 120 illustrated in FIG. 1 and/or the controller 220 illustrated in FIG. 2, herein), a DRAM memory device 331 (which can be analogous to one of the memory devices 123, 125 illustrated in FIG. 1 and/or one of the memory devices 223, 225, 227 illustrated in FIG. 2, herein), and a NAND memory device 333 (which can be analogous to one of the memory devices 123, 125 illustrated in FIG. 1 and/or one of the memory devices 223, 225, 227 illustrated in FIG. 2, herein). In some embodiments, the memory system 304 can be resident on an electronic control unit, such as the ECU 101 illustrated in FIG. 1, herein.

As shown in FIG. 3, the NAND memory device 333 can include various portions of memory cells, which can include a set of single level memory cells (SLCs) 335 and a set of multi-level memory cells (MLCs), such as a set of triple-level memory cells (TLCs) 337. In some embodiments, the controller can cause data corresponding to an image of an unknown object to be written to the SLC portion 335 and/or or the TLC portion 337 as part of an operation performed by the autonomous vehicle to resolve the unknown object.

For example, data that is classified as hot data can be written to the SLC portion 335 while data that is classified as cold data can be written to the TLC portion 337, or vice versa, as part of optimizing performance of the memory system 304 during performance of operations to resolve an unknown object. By selectively writing portions of data corresponding to the unresolved object to different memory portions (e.g., to a SLC portion 335 and/or a TLC portion 337) of the NAND memory device 333, performance of the computing system, especially during performance of operations to resolve an unknown object described herein, can be improved in comparison to some approaches. Embodiments are not so limited, however, and in some embodiments, hot data corresponding to the unknown object can be written to the DRAM memory device 331, colder data corresponding to the unknown object can be written to the NAND memory device 333, and cold data can be written to the emerging memory device (e.g., the emerging memory device 439 illustrated in FIG. 4, herein). Embodiments are not so limited, however, and in some embodiments, data corresponding to the unknown object can be written to faster or higher bandwidth memory devices (e.g., the SLC portion 335 of the NAND memory device 333 and/or the DRAM memory device 331), while data corresponding to other operations performed by the autonomous vehicle can be written to slower or lower bandwidth memory devices (e.g., the TLC portion 337 of the NAND memory device 331 and/or the emerging memory device).

For example, by selectively writing portions of data that correspond to workloads that benefit from rapid executed to the DRAM memory device 331 (e.g., performance of operations to resolve an unknown object) while writing portions of data that correspond to workloads (e.g., other operations that may not be as time-sensitive or critical as rapidly identifying the unknown object) that may not benefit as much from rapid execution to the SLC portion 335 and/or the TLC portion 337, and/or to the emerging memory device (e.g., the emerging memory device 439 illustrated in FIG. 4), workloads can be allocated to memory devices within the memory system 304 that can allow for optimized execution of the workloads within the memory system 304. For similar reasons, portions of the workloads can be written to an emerging memory device (e.g., the emerging memory device 439 illustrated in FIG. 4, herein).

Figure 4:
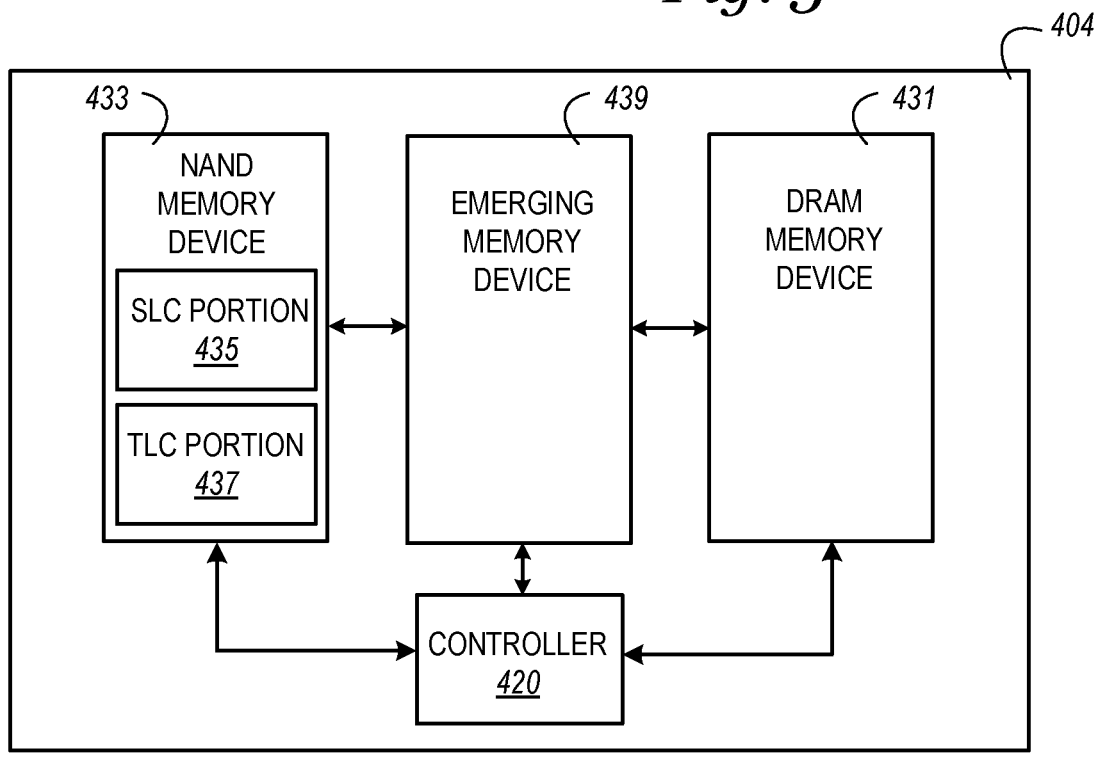
FIG. 4 is another functional block diagram in the form of an apparatus including a memory system in accordance with a number of embodiments of the present disclosure.

FIG. 4 is another functional block diagram in the form of an apparatus including a memory system 404 in accordance with a number of embodiments of the present disclosure. FIG. 4 illustrates a memory system 404, which can be analogous to the memory system 104 illustrated in FIG. 1, the memory system 204 illustrated in FIG. 2, and/or the memory system 304 illustrated in FIG. 3, herein.

As shown in FIG. 4, the memory system 404 includes a controller 420 (which can be analogous to the controller 120 illustrated in FIG. 1, the controller 220 illustrated in FIG. 2, and/or the controller 320 illustrated in FIG. 3, herein), a DRAM memory device 431 (which can be analogous to one of the memory devices 123, 125 illustrated in FIG. 1, one of the memory devices 223, 225, 227 illustrated in FIG. 2, and/or one of the DRAM memory device 331 illustrated in FIG. 3, herein), a NAND memory device 433 (which can be analogous to one of the memory devices 123, 125 illustrated in FIG. 1, one of the memory devices 223, 225, 227 illustrated in FIG. 2, and/or the NAND memory device 333 illustrated in FIG. 3, herein), and an emerging memory device 439 (which can be analogous to one of the memory devices 123, 125 illustrated in FIG. 1 and/or one of the memory devices 223, 225, 227 illustrated in FIG. 2, herein).

The DRAM memory device 431 can include an array of memory cells that include at least one transistor and one capacitor configured to store a charge corresponding to a single data bit. The NAND memory device 433 can include various portions of memory cells, which can include a set of single level memory cells (SLCs) 435 and a set of multi-level memory cells (MLCs), such as a set of triple-level memory cells (TLCs) 437, which can be analogous to the SLC portion 335 and the TLC portion 337, respectively, illustrated and described in connection with FIG. 3, herein.

The emerging memory device 439 can be an emerging memory device, as described above. For example, the emerging memory device 439 can be a resistance variable (e.g., 3-D Crosspoint (3D XP)) memory devices, memory devices that include an array of self-selecting memory (SSM) cells, etc., or any combination thereof.

Figure 5:
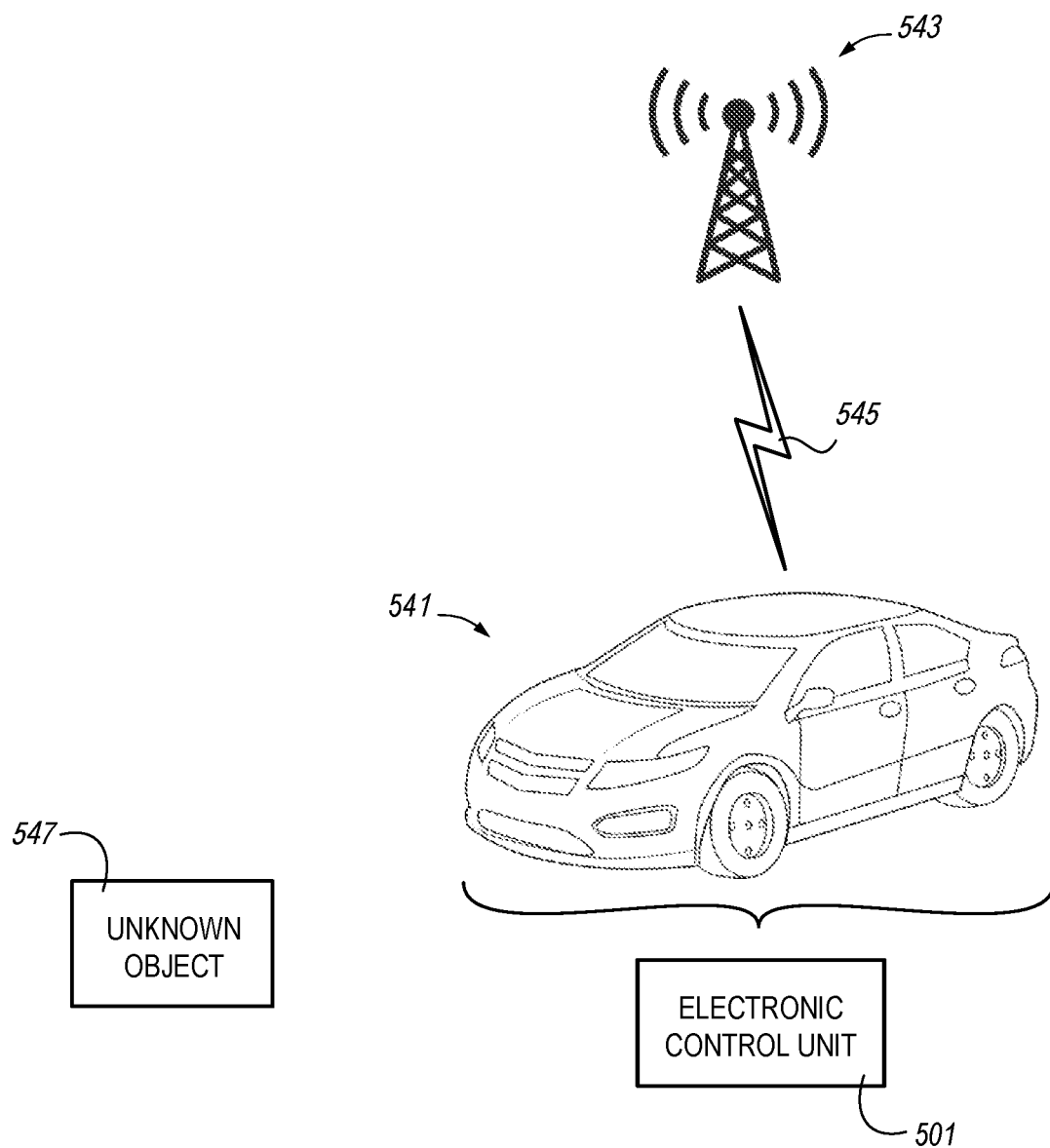
FIG. 5 is a diagram illustrating an autonomous vehicle that includes an electronic control unit in accordance with a number of embodiments of the present disclosure.

FIG. 5 is a diagram illustrating an autonomous vehicle 541 that includes an electronic control unit (ECU) 501 in accordance with a number of embodiments of the present disclosure. As shown in FIG. 5, the autonomous vehicle 541 is in communication with a base station 543 via a communication path 545. The ECU 501 can be analogous to the ECU 101 illustrated in FIG. 1, herein. As shown in FIG. 5, an unknown object 547 can be located in a driving path of the autonomous vehicle 541.

The unknown object 547 can be an object or obstacle that is located along or adjacent to a driving path of the autonomous vehicle 541. As mentioned above, the unknown object 547 can be an object or obstacle that is not readily recognized by the autonomous vehicle 541 (e.g., by the ECU 501 of the autonomous vehicle 541) either because the unknown object 547 has not been observed before by the autonomous vehicle 541, has not been recorded in an object or obstacle database accessible to the autonomous vehicle 541, and/or is a known object that has been obfuscated, defaced, or otherwise altered to an extent that autonomous vehicle 541 is unable to recognize the unknown object 547.

As shown in FIG. 5, the imaging device 521 can receive information (e.g., images and/or video) related to the unknown object 547. The information can be processed and/or analyzed within the autonomous vehicle 541 for example, using the ECU 501. In some embodiments, the information (e.g., the images and/or video) can be processed by the autonomous vehicle 541 as part of performance of an operation to resolve the unknown object 547 to determine what the unknown object 547 is. As described above, execution of operations to resolve the unknown object 547 can give rise to demanding workloads. Accordingly, as described herein, the information can be selectively written to different memory devices (e.g., the memory devices 223, 225, and/or 227 illustrated in FIG. 2, herein), and therefore different media types (e.g., the media types 224, 226, and/or 228 illustrated in FIG. 2, herein) based on characteristics of the workloads.

In a non-limiting example, a system can include an electronic control unit (ECU) 501 that is resident on an autonomous vehicle 541. As described above in connection with FIG. 1, the ECU 501 includes a first memory device that includes a first type of media (e.g., the memory device 123 with the media type 124 illustrated in FIG. 1), a second memory device that includes a second type of media (e.g., the memory device 125 with the media type 126 illustrated in FIG. 1), an imaging device (e.g., the imaging device 121 illustrated in FIG. 1), and a processing unit (e.g., the processing unit 122 illustrated in FIG. 1) that is coupled to the first memory device, the second memory device, and the imaging device.

In some embodiments, the processing unit can determine that the first memory device exhibits greater performance characteristics than the second memory device, or vice versa. The processing unit can also, as described above, perform a traffic sequence prediction operation to determine that greater than a threshold amount of objects will be encountered by the autonomous vehicle within a threshold period of time. The processing unit can pre-allocate processing resources available to the autonomous vehicle from the second memory device to the first memory device in response to the determination that greater than the threshold amount of objects will be encountered by the autonomous vehicle within the threshold period of time.

The processing unit can then cause the imaging device to capture at least one image corresponding to an unknown object 547 disposed within a sight line of the imaging device (e.g., an unknown object 547 disposed along a driving path of the autonomous vehicle). The processing unit can further determine that the first memory device exhibits greater performance characteristics than the second memory device. In some embodiments, the processing unit can determine that the first memory device exhibits greater performance characteristics by determining that the first memory device exhibits at least one of a higher bandwidth or a faster memory access time, or both, than the second memory device.

Subsequent to pre-allocation of the processing resources available to the autonomous vehicle from the second memory device to the first memory device the processing unit can perform, using the pre-allocated processing resources, an operation involving the captured at least one image corresponding to the unknown object to classify the unknown object 547.

In some embodiments, the processing unit can transfer information stored in the first memory device to the second memory device to increase an amount of available memory resources associated with the first memory device in response to capture of the at least one image. This can ensure that there are adequate memory resources available in the faster memory device to store and process incoming images of an unknown object 547.

The processing unit can, in some embodiments, receive information corresponding to the unknown object 547 from a base station 543 in communication with the autonomous vehicle 541. For example, the base station 543 may have previously received information corresponding to the unknown object 547 from other autonomous vehicles that have encountered the unknown object 547 and/or other autonomous vehicles that have been in communication with the base station 543. In such embodiments, the processing unit can perform, using the reallocated processing resources, the operation involving the data corresponding to the unknown object and the received information corresponding to the unknown object 547 to classify the unknown object 547.

In some embodiments, the processing unit can receive confidence information regarding at least one pixel of an image stored by the base station 543 as part of receiving the information corresponding to the unknown object 547 from the base station 543 when the image stored by the base station is determined to be similar to the unknown object 543. For example, if the autonomous vehicle 541 and/or the base station 543 determine that an image stored by the base station 543 or the autonomous vehicle 541 is similar to the unknown object 547, the base station 543 or the autonomous vehicle 541 can generate information corresponding to how confident the base station 543 or the autonomous vehicle 541 is that one or more pixels of the similar image correspond to the unknown object 547.

Continuing with the above example, the autonomous vehicle can further include a smart network that can initiate performance of the operation involving the captured at least one image corresponding to the unknown object to classify the unknown object 547. As used herein, a "smart network" generally refers to a network that includes enough intelligence that identification and transfer of data are performed by the network itself through protocols that automatically identify what things are (e.g., via deep learning) and can validate, confirm, and route transactions within the network.

Figure 6:
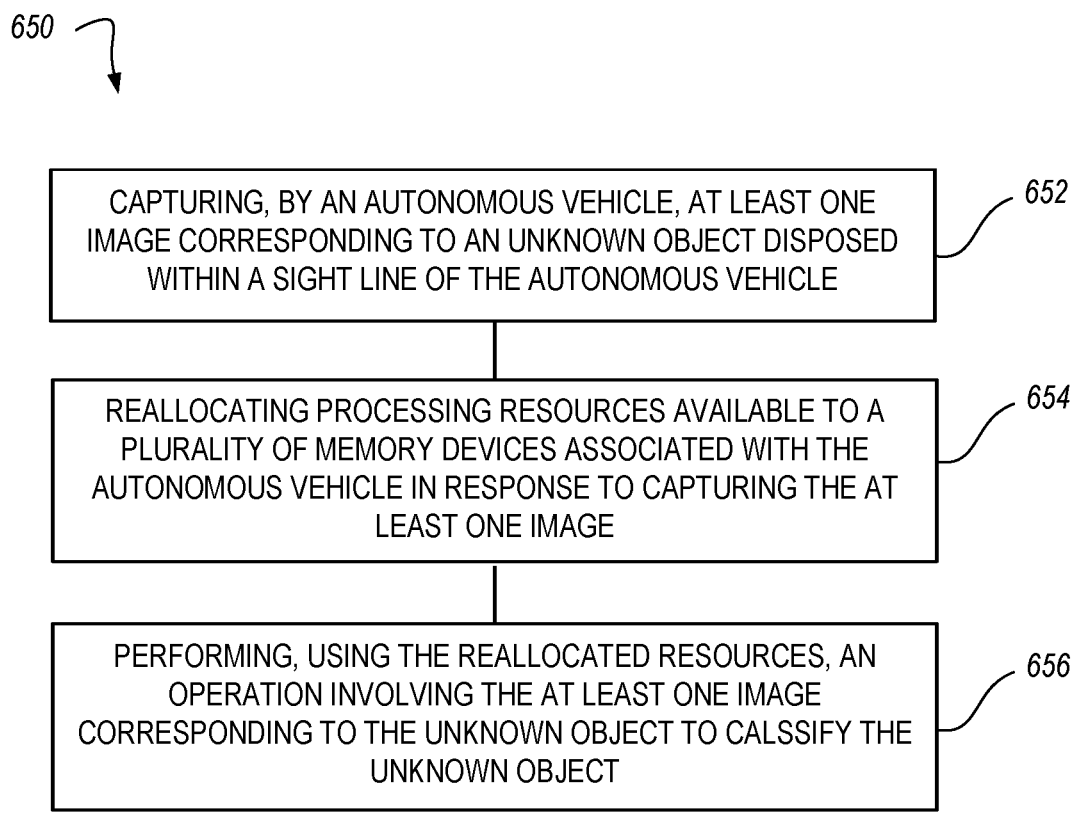
FIG. 6 is a flow diagram representing an example method corresponding to autonomous vehicle object detection in accordance with a number of embodiments of the present disclosure.

FIG. 6 is a flow diagram representing an example method corresponding autonomous vehicle object detection in accordance with a number of embodiments of the present disclosure. The method 650 can be performed by processing logic that can include hardware (e.g., processing unit(s), processing device(s), control circuitry, dedicated logic, programmable logic, microcode, hardware of a device, and/or integrated circuit(s), etc.), software (e.g., instructions run or executed on a processing unit), or a combination thereof. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 652, the method 650 can include capturing, by an autonomous vehicle, at least one image corresponding to an unknown object disposed within a sight line of the autonomous vehicle. The autonomous vehicle can be analogous to the autonomous vehicle 541 illustrated in FIG. 5 and the unknown object can be analogous to the unknown object 547 illustrated in FIG. 5.

At block 654, the method 650 can include reallocating processing resources available to a plurality of memory devices associated with the autonomous vehicle in response to capturing the at least one image. In some embodiments, memory devices among the plurality of memory devices can include different media types. For example, one of the memory devices can be analogous to the memory device 123, 223, while a different memory device can be analogous to the memory device 125, 225, 227 illustrated in FIGS. 1 and 2, herein. Accordingly, the plurality of memory devices can include at least two different types of memory devices. Further, the media type of one of the memory devices can be analogous to the media type 124, 224, while the media type of a different memory device can be analogous to the media type 126, 226, 228 illustrated in FIGS. 1 and 2, herein.

In some embodiments the method 650 can include reallocating the processing resources such that a memory device among the plurality of memory devices that exhibits a higher bandwidth than another memory device among the plurality of memory devices is available to receive the at least one image and performing the operation involving the data corresponding to the unknown object to classify the unknown object using the memory device that exhibits the higher bandwidth than the other memory device among the plurality of memory devices. Embodiments are not so limited, however, and in some embodiments the method 650 reallocating the processing resources such that a memory device among the plurality of memory devices that exhibits a faster memory access time than another memory device among the plurality of memory devices is available to receive the at least one image and performing the operation involving the data corresponding to the unknown object to classify the unknown object using the memory device that exhibits the faster memory access time than the other memory device among the plurality of memory devices.

At block, 656, the method 650 can include performing, using the reallocated processing resources, an operation involving the at least one image corresponding to the unknown object to classify the unknown object. In some embodiments, the method 650 can include comparing the at least one captured image corresponding to the unknown object to at least one image stored by the autonomous vehicle that is determined to be similar to the unknown object to classify the unknown object.

In some embodiments, the method 650 can include receiving information corresponding to the unknown object from a base station (e.g., the base station 543 illustrated in FIG. 5, herein) in communication with the autonomous vehicle and performing, using the reallocated processing resources, the operation involving the data corresponding to the unknown object and the received information corresponding to the unknown object to classify the unknown object. In some embodiments, the method 650 can further include receiving confidence information regarding at least one pixel of an image stored by the base station as part of receiving the information corresponding to the unknown object from the base station, wherein the image stored by the base station is determined to be similar to the unknown object.

The method 650 can further include performing, by the autonomous vehicle, a traffic sequence prediction operation prior to capturing the at least one image corresponding to the unknown object and pre-allocating, prior to capturing the at least one image corresponding to the unknown object, the processing resources available to the plurality of memory devices associated with the autonomous vehicle in response to the traffic sequence prediction operation indicating that the autonomous vehicle will encounter greater than a threshold quantity of objects within a threshold period of time. In such embodiments, the method can further include performing, using the pre-allocated processing resources, the operation involving the at least one image corresponding to the unknown object to classify the unknown object.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
    capturing, by an autonomous vehicle, at least one image corresponding to an unknown object disposed within a sight line of the autonomous vehicle;
    reallocating processing resources available to a plurality of memory devices associated with the autonomous vehicle; and
    performing, using the reallocated processing resources, an operation involving the at least one image corresponding to the unknown object to classify the unknown object; and
    reallocating the processing resources such that a memory device among the plurality of memory devices that exhibits one of a higher bandwidth or a faster memory access time than another memory device among the plurality of memory devices is available to receive the at least one image; and
    performing the operation involving the at least one image corresponding to the unknown object to classify the unknown object using the memory device that exhibits the one of the higher bandwidth or the faster memory access time than the another memory device among the plurality of memory devices.

2. The method of claim 1, further comprising comparing the at least one captured image corresponding to the unknown object to at least one image stored by the autonomous vehicle that is determined to be similar to the unknown object to classify the unknown object.

3. The method of claim 1, wherein the plurality of memory devices includes at least to different types of memory devices.

4. The method of claim 1, further comprising:
    receiving information corresponding to the unknown object from a base station in communication with the autonomous vehicle; and performing, using the reallocated processing resources, the operation involving the data corresponding to the unknown object and the received information corresponding to the unknown object to classify the unknown object.

5. The method of claim 4, further comprising receiving confidence information regarding at least one pixel of an image stored by the base station as part of receiving the information corresponding to the unknown object from the base station, wherein the image stored by the base station is determined to be similar to the unknown object.

6. An apparatus, comprising:
a first memory device comprising a first type of media;
a second memory device comprising a second type of media; and
a processing unit coupled to the first memory device and the second memory device, wherein the first memory device, the second memory device, and the processing unit are resident on an autonomous vehicle, and wherein the processing unit is to:
execute instructions corresponding to a traffic sequence prediction operation;
pre-allocate processing resources available to the first memory device and the second memory device in response to a determination that the traffic sequence prediction operation indicates that greater than a threshold amount of objects will be encountered by the autonomous vehicle;
cause at least one image corresponding to an unknown object to be captured; and
perform, using the reallocated processing resources, an operation involving the captured at least one image corresponding to the unknown object to classify the unknown object.

7. The apparatus of claim 6, wherein the processing unit is to:
receive information corresponding to the unknown object from a base station; and
cause, using the reallocated processing resources, performance of the operation involving the data corresponding to the unknown object and the received information corresponding to the unknown object to classify the unknown object.

8. The apparatus of claim 6, wherein:
the first memory device or the second memory device has a higher bandwidth than the other of the first memory device or the second memory device, and
the processing unit is to perform the operation to reallocate processing resources available to the first memory device and the second memory device such that a greater amount of processing resources are available to the memory device that has the higher bandwidth for performance of the operation to classify the unknown object.

9. The apparatus of claim 6, wherein:
the first memory device or the second memory device has a faster memory access time than the other of the first memory device or the second memory device, and
the processing unit is to perform the operation to reallocate processing resources available the first memory device and the second memory device such that greater amount of processing resources are available to the memory device that has the faster memory access time for performance of the operation to classify the unknown object.

10. The apparatus of claim 6, wherein the first memory device is a NAND memory device comprising a plurality of single level cells, a high bandwidth memory device, or a DRAM device, and wherein the second memory device is three-dimensional (3D) crosspoint memory device or a NAND memory device comprising a plurality of multi-level cells.

11. A system, comprising:
an electronic control unit (ECU) resident on an autonomous vehicle, the ECU comprising:
a first memory device comprising a first type of media;
a second memory device comprising a second type of media;
an imaging device; and
a processing unit coupled to the first memory device, the second memory device, and the imaging device, wherein the processing unit is to:
determine that the first memory device exhibits greater performance characteristics than the second memory device;
perform a traffic sequence prediction operation to determine that greater than a threshold amount of objects will be encountered by the autonomous vehicle within a threshold period of time;
pre-allocate processing resources available to the autonomous vehicle from the second memory device to the first memory device in response to the determination that greater than the threshold amount of objects will be encountered by the autonomous vehicle within the threshold period of time;
cause the imaging device to capture at least one image corresponding to an unknown object disposed within a sight line of the imaging device; and
perform, using the pre-allocated processing resources, an operation involving the captured at least one image corresponding to the unknown object to classify the unknown object.

12. The system of claim 11, wherein the processing unit is to transfer information stored in the first memory device to the second memory device to increase an amount of available memory resources associated with the first memory device in response to capture of the at least one image.

13. The system of claim 11, wherein the processing unit is to:
receive information corresponding to the unknown object from a base station in communication with the autonomous vehicle; and
perform, using the reallocated processing resources, the operation involving the data corresponding to the unknown object and the received information corresponding to the unknown object to classify the unknown object.

14. The system of claim 13, wherein the processing unit is to receive confidence information regarding at least one pixel of an image stored by the base station as part of receiving the information corresponding to the unknown object from the base station, wherein the image stored by the base station is determined to be similar to the unknown object.

15. The system of claim 11, wherein the processing unit is to determine that the first memory device exhibits greater performance characteristics by determining that the first memory device exhibits at least one of a higher bandwidth or a faster memory access time, or both, than the second memory device.

16. The system of claim 11, wherein:
the autonomous vehicle further comprises a smart network, and
the smart network is to initiate performance of the operation involving the captured at least one image corresponding to the unknown object to classify the unknown object.

17. The system of claim 11, wherein the unknown object is disposed along a driving path of the autonomous vehicle.

18. A method, comprising:
capturing, by an autonomous vehicle, at least one image corresponding to an unknown object disposed within a sight line of the autonomous vehicle;
reallocating processing resources available to a plurality of memory devices associated with the autonomous vehicle;
performing, using the reallocated processing resources, an operation involving the at least one image corresponding to the unknown object to classify the unknown object; and
performing, by the autonomous vehicle, a traffic sequence prediction operation prior to capturing the at least one image corresponding to the unknown object;
pre-allocating, prior to capturing the at least one image corresponding to the unknown object, the processing resources available to the plurality of memory devices associated with the autonomous vehicle in response to the traffic sequence prediction operation indicating that the autonomous vehicle will encounter greater than a threshold quantity of objects within a threshold period of time; and
performing, using the pre-allocated processing resources, the operation involving at least one image corresponding to the unknown object to classify the unknown object.

* * * * *